United States Patent
Takahashi

(10) Patent No.: US 8,666,256 B2
(45) Date of Patent: Mar. 4, 2014

(54) OPTICAL TRANSCEIVING SYSTEM WITH FRAME SYNCHRONIZATION AND OPTICAL RECEIVING APPARATUS

(75) Inventor: Tsugio Takahashi, Minato-ku (JP)

(73) Assignee: NEC Corporation, Tokyo (JP)

( * ) Notice: Subject to any disclaimer, the term of this patent is extended or adjusted under 35 U.S.C. 154(b) by 148 days.

(21) Appl. No.: 13/425,625

(22) Filed: Mar. 21, 2012

(65) Prior Publication Data

US 2012/0243877 A1 Sep. 27, 2012

(30) Foreign Application Priority Data

Mar. 22, 2011 (JP) .................................. 2011-063132

(51) Int. Cl.
*H04B 10/00* (2013.01)
*H04B 10/40* (2013.01)
(52) U.S. Cl.
CPC ...................................... *H04B 10/40* (2013.01)
USPC ............................ 398/136; 398/154; 398/202

(58) Field of Classification Search
USPC .................................. 398/136, 154, 158, 202
See application file for complete search history.

(56) References Cited

U.S. PATENT DOCUMENTS

| | | | |
|---|---|---|---|
| 7,043,162 B2 * | 5/2006 | Kubo et al. ................... | 398/140 |
| 7,113,703 B2 * | 9/2006 | Murata ........................ | 398/79 |
| 2002/0120902 A1 * | 8/2002 | Brown ......................... | 714/776 |
| 2011/0150469 A1 * | 6/2011 | Nonaka et al. ................ | 398/52 |

FOREIGN PATENT DOCUMENTS

JP 11-331140 A 11/1999

\* cited by examiner

*Primary Examiner* — Dalzid Singh
(74) *Attorney, Agent, or Firm* — Sughrue Mion, PLLC

(57) ABSTRACT

An optical receiving apparatus with frame synchronization technology which makes it easy to activate a frame synchronization established state even if bit errors are produced over a transmission link. The apparatus includes: an optoelectrical converting circuit; a pre-stage synchronizing word detecting circuit; a decoder; a post-stage frame synchronization detecting circuit; and a receiver frame synchronization display output circuit.

12 Claims, 14 Drawing Sheets

Fig.3

| FRAME NUMBER | #1 | #2 | #3 | #4 | #5 | #6 | #7 | #8 | #9 | #10 | #11 | #12 | #13 | #14 | #15 | #16 | #17 | #18 |
|---|---|---|---|---|---|---|---|---|---|---|---|---|---|---|---|---|---|---|
| NUMBER OF BIT ERRORS OF SYNCHRONIZING WORD | 3 | 5 | 0 | 4 | 3 | 3 | 5 | 4 | 0 | 5 | 3 | 0 | 3 | 4 | 3 | 0 | 3 | 0 |
| FRAME SYNCHRONIZATION PROTECTION COUNTER | 0 | 0 | 1 | 1 | 0 | 0 | 0 | 0 | 1 | 1 | 0 | 1 | 1 | 0 | 0 | 1 | 1 | 1 |
| FRAME SYNCHRONIZATION DETECTING SIGNAL | - | - | - | - | 0 | 1 | 0 | 1 | 0 | 1 | 2 | 3 | 4 | 5 | 6 | 7 | | |
| FRAME SYNCHRONIZATION PROTECTION COUNTER | - | - | | | | | | | | | | | | | | | - | - |
| RECEIVER FRAME SYNCHRONIZATION DISPLAY SIGNAL | | | | | | | | | | | | | | | | | | |

OPTICAL TRANSCEIVING SYSTEM WITH FRAME SYNCHRONIZATION AND OPTICAL RECEIVING APPARATUS

BACKGROUND OF THE INVENTION

1. Field of the Invention

The present invention relates to an optical transceiving system and an optical receiving apparatus.

2. Description of the Related Art

At present, there have been proposed a variety of technologies for increasing the reliability of transmission links in the field of optical communications. For example, a technology has been proposed for operating a plurality of frame synchronizing circuits parallel to each other and establishing frame synchronization with any one of the frame synchronizing circuits (see, for example, JP11-331140A). According to this proposed technology, however, it is difficult to see if the transmission data contain many errors.

FEC (Forward Error Correction) processes with a high error correction capability have been made practically feasible by the advances of digital circuit technologies. Therefore, attention has been paid to a technology for increasing the reliability of transmission links by correcting errors based on FEC processes.

FIG. 1 of the accompanying drawings is a block diagram showing the configuration of an optical transceiving system incorporating an FEC process therein. As shown in FIG. 1, the optical transceiving system includes optical transmitting apparatus 70 and optical receiving apparatus 80 which are connected to each other by optical fiber transmission link 40. Optical transmitting apparatus 70 includes frame generating circuit 71, FEC encoder 72, and electrooptical converting circuit 75. Optical receiving apparatus 80 includes frame terminating circuit 81, FEC decoder 82, optoelectrical converting circuit 85, synchronizing word detecting circuit 91, frame synchronization detecting circuit 92, and receiver frame synchronization display circuit 95.

FIG. 2 of the accompanying drawings is a diagram showing by way of example the makeup of a frame of an optical system that is used in a general OTN (Optical Transport Network) including the optical transceiving system shown in FIG. 1. As shown in FIG. 2, one frame is made up of 16,320 bytes including 6 bytes at its beginning, with a synchronizing word for establishing frame synchronization being assigned thereto.

FIG. 3 of the accompanying drawings is a timing chart illustrative of the operation of the optical transceiving system shown in FIG. 1.

Synchronizing word detecting circuit 91 of optical receiving apparatus 80 receives a frame generated by frame generating circuit 71 of optical transmitting apparatus 70, and detects the synchronizing word of the frame. Frame synchronization detecting circuit 92 determines whether or not the detected synchronizing word contains a bit error. If frame synchronization detecting circuit 92 detects a plurality of successive synchronizing words (hereinafter, two synchronizing words) free of a bit error, then receiver frame synchronization display circuit 95 makes a receiver frame synchronization display signal high, thereby establishing frame synchronization.

As shown in FIG. 3, even though the synchronizing word of a frame having frame number #3 is free of a bit error, if the synchronizing word of a frame having frame number #4 suffers a bit error, then no frame synchronization is established.

As the error rate of optical fiber transmission link 40 increases, the probability that synchronizing words contain bit errors becomes higher, making it time-consuming to establish frame synchronization. Consequently, many data signals are discarded, and the throughput of the communication network is reduced.

SUMMARY OF THE INVENTION

It is an object of the present invention to provide a frame synchronization technology which makes it easy to activate a frame synchronization established state even if bit errors are produced over a transmission link.

To solve the above object, an optical receiving apparatus accordance with the present invention comprisese an optoelectrical converting circuit which receives an optical signal and optoelectrically converts the optical signal to reproduce an error-correcting-code-added electric signal; a pre-stage synchronizing word detecting circuit which detects a synchronizing word included in said error-correcting-code-added electric signal; a decoder which performs an error correcting process on the error-correcting-code-added electric signal from which the synchronizing word has been detected, to reproduce a frame-added electric signal; a post-stage frame synchronization detecting circuit which determines whether or not the first number of successive synchronizing words whose bit errors are equal to or smaller than a first allowable value, among synchronizing words included in said frame-added electric signal, has reached a first prescribed number, in a predetermined number of frames subsequent to a frame in which said synchronizing word has been detected; and a receiver frame synchronization display output circuit which decides that frame synchronization of said optical signal has been established if said first number of successive synchronizing words has reached said first prescribed number.

Also, an optical transceiving system accordance in with the present invention includes an optical transmitting apparatus and an optical receiving apparatus, wherein said optical transmitting apparatus comprises, a frame generating circuit which adds a synchronizing word to a data signal to generate a frame-added electric signal, an encoder which adds an error correcting code to said frame-added electric signal to generate an error-correcting-code-added electric signal, and an electrooptical converting circuit which converts said error-correcting-code-added electric signal into an optical signal and transmits the optical signal, and wherein said optical receiving apparatus comprises, an optoelectrical converting circuit which receives an optical signal and optoelectrically converts the optical signal to reproduce an error-correcting-code-added electric signal; a pre-stage synchronizing word detecting circuit which detects a synchronizing word included in said error-correcting-code-added electric signal; an FEC decoder which performs an error correcting process on the error-correcting-code-added electric signal from which the synchronizing word has been detected, to reproduce a frame-added electric signal, a post-stage frame synchronization detecting circuit which determines whether or not the first number of successive synchronizing words whose bit errors are equal to or smaller than a first allowable value, among synchronizing words included in said frame-added electric signal, has reached a first prescribed number, in a predetermined number of frames subsequent to a frame in which said synchronizing word has been detected; and a receiver frame synchronization display output circuit which decides that frame synchronization of said optical signal has been established if said first number of successive synchronizing words has reached said first prescribed number.

Also, an optical receiving method accordance with the present invention comprising, receiving an optical signal and optoelectrically converting the optical signal to reproduce an error-correcting-code-added electric signal, detecting a synchronizing word included in said error-correcting-code-added electric signal, performing an error correcting process on the error-correcting-code-added electric signal from which the synchronizing word has been detected, to reproduce a frame-added electric signal, determining whether the first number of successive synchronizing words whose bit errors are equal to or smaller than a first allowable value, among synchronizing words included in said frame-added electric signal, has reached a first prescribed number or not, in a predetermined number of frames subsequent to a frame in which said synchronizing word has been detected, and deciding that frame synchronization of said optical signal has been established if said first number of successive synchronizing words has reached said first prescribed number.

The above and other objects, features, and advantages of the present invention will become apparent from the following description with reference to the accompanying drawings which illustrate examples of the present invention.

BRIEF DESCRIPTION OF THE DRAWINGS

FIG. 3 is a timing chart illustrative of operation of the optical transceiving system according to the related art;

DETAILED DESCRIPTION OF THE PREFERRED EMBODIMENTS

Figure 1:
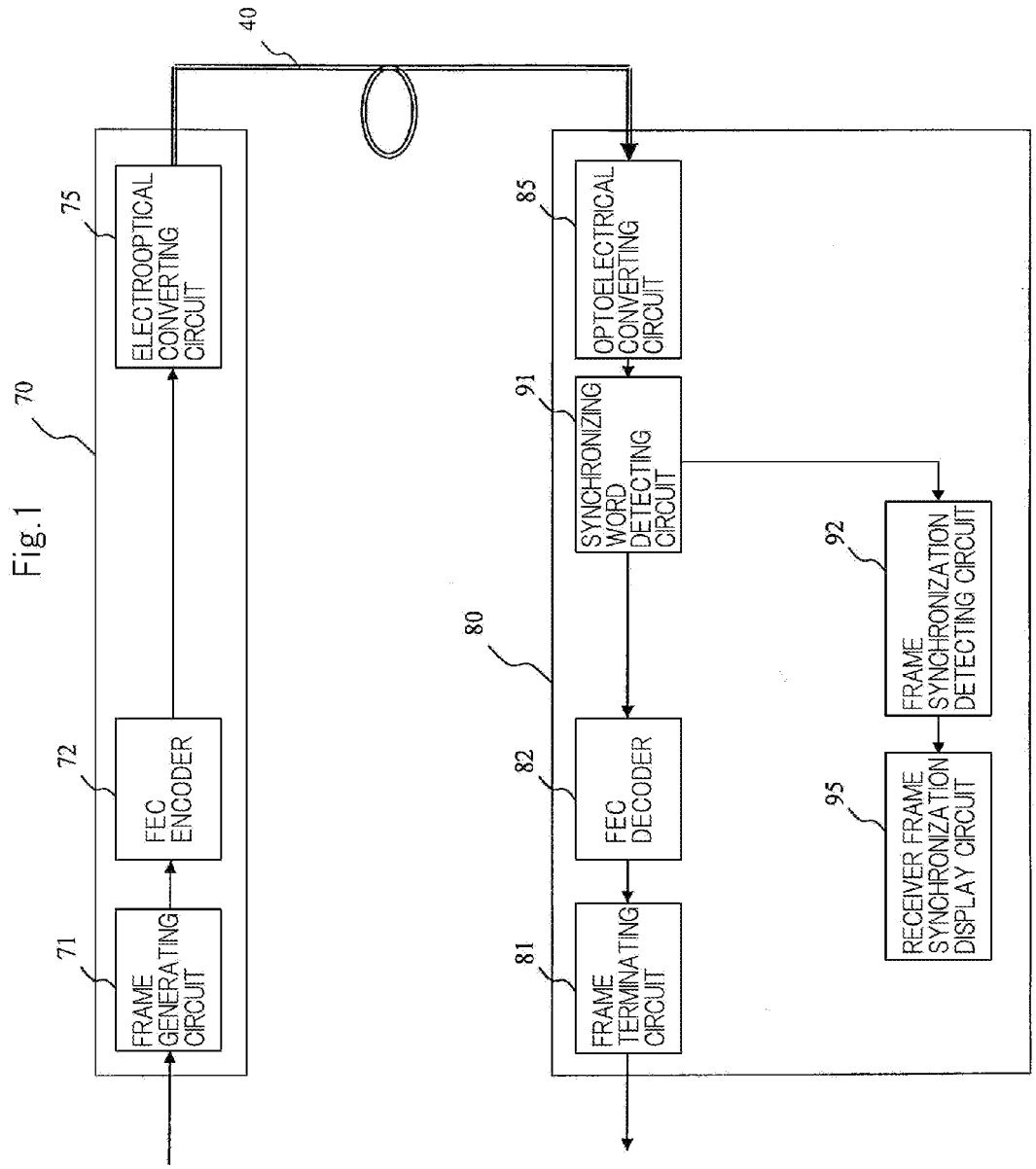
FIG. 1 is a block diagram showing the configuration of an optical transceiving system according to the related art.

Exemplary embodiments of the present invention will be described below with reference to the drawings. Those parts having identical functions are denoted by identical reference characters throughout views, and will not be described in detail below.

Exemplary Embodiment 1

Figure 4:
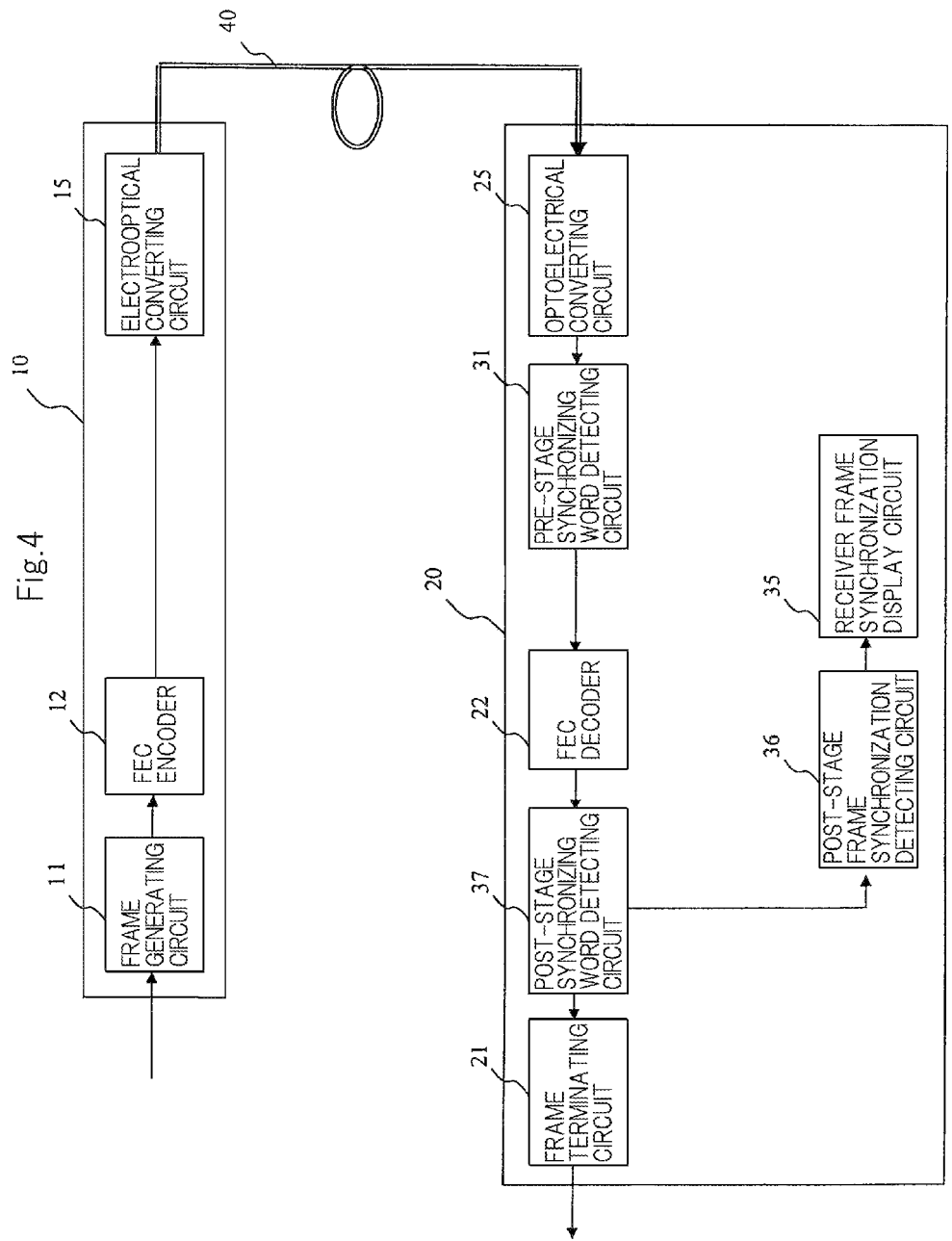
FIG. 4 is a block diagram showing the configuration of an optical transceiving system according to an exemplary embodiment of the present invention.

FIG. 4 is a block diagram showing the configuration of an optical transceiving system according to the present exemplary embodiment of the present invention. As shown in FIG. 4, the optical transceiving system includes optical transmitting apparatus 10 and optical receiving apparatus 20 which are connected to each other by optical fiber transmission link 40. Optical fiber transmission link 40 may have optical repeaters or the like.

Optical transmitting apparatus 10 includes frame generating circuit 11, FEC (Forward Error Correction) encoder 12, and electrooptical converting circuit 15.

Frame generating circuit 11 is supplied with an electric signal as a data signal. Frame generating circuit 11 adds a synchronizing word for establishing frame synchronization to the supplied data signal, to generate and output a frame-added electric signal.

FEC encoder 12 adds an error correcting code to the frame-added electric signal from frame generating circuit 11, thereby generating an error-correcting-code-added electric signal.

Electrooptical converting circuit 15 converts the error-correcting-code-added electric signal from FEC circuit 12 into an optical signal, and sends the optical signal through optical fiber transmission link 40 to optical receiving apparatus 20.

Optical receiving apparatus 20 includes frame terminating circuit 21, FEC decoder 22, optoelectrical converting circuit 25, pre-stage synchronizing word detecting circuit 31, receiver frame synchronization display output circuit 35, post-stage frame synchronization detecting circuit 36, and post-stage synchronizing word detecting circuit 37.

Optoelectrical converting circuit 25 receives an optical signal from optical transmitting circuit 10 through optical fiber transmission link 40, optoelectrically converts the received optical signal, reproduces an error-correcting-code-added electric signal from the optical signal, and outputs the error-correcting-code-added electric signal.

Pre-stage synchronizing word detecting circuit 31 searches for and detects a synchronizing word included in the error-correcting-code-added electric signal from optoelectrical converting circuit 25.

Figure 2:
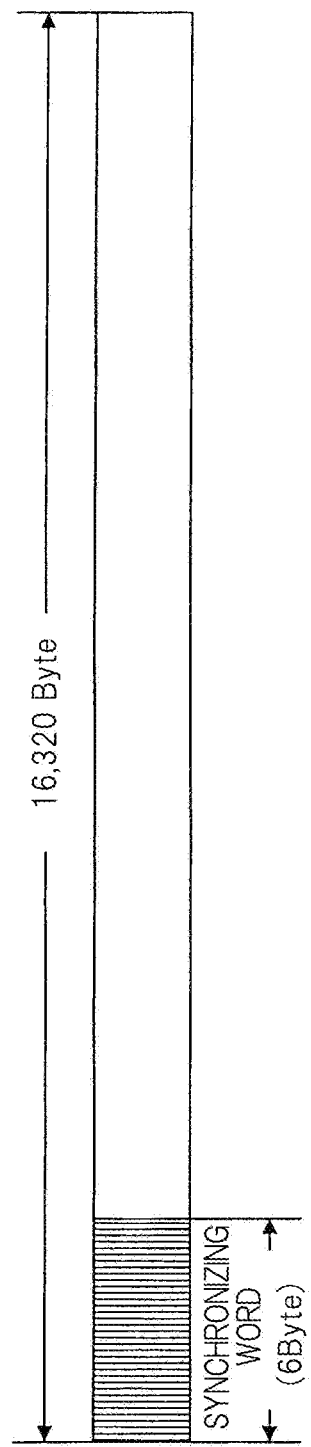
FIG. 2 is a diagram showing by way of example the makeup of a frame used in an OTN according to the related art.

If an error-correcting-code-added electric signal has a frame makeup as shown in FIG. 2, for example, then pre-stage synchronizing word detecting circuit 31 detects information represented by 6 bytes at the beginning of the frame as a synchronizing word. Pre-stage synchronizing word detecting circuit 31 may detect a synchronizing word whose bit error is equal to or smaller than an allowable value. If the allowable value is 0, then pre-stage synchronizing word detecting circuit 31 detects a synchronizing word free of the bit error.

When pre-stage synchronizing word detecting circuit 31 detects a synchronizing word, it outputs a pre-stage frame synchronization detecting signal indicating the detection of the synchronizing word and an error-correcting-code-added electric signal indicating the position of the synchronizing word. A signal indicating the position of a synchronizing word will hereinafter generally be referred to as a synchronized signal.

When pre-stage synchronizing word detecting circuit 31 detects a synchronizing word, it interrupts the process of searching for and detecting a synchronizing word, and continues to output a synchronized error-correcting-code-added electric signal, using the detected synchronizing word.

In response to the pre-stage frame synchronization detecting signal output from pre-stage synchronizing word detecting circuit 31, FEC decoder 22 performs an error correcting process on the synchronized error-correcting-code-added electric signal from pre-stage synchronizing word detecting circuit 31, and reproduces and outputs a frame-added electric signal. FEC decoder 22 also performs the error correcting process on the synchronizing word included in the error-correcting-code-added electric signal. The frame-added electric signal has reduced bit errors because of the error correcting process that has been performed.

Post-stage synchronizing word detecting circuit 37 searches for and detects a synchronizing word included in the frame-added electric signal from FEC decoder 22. When post-stage synchronizing word detecting circuit 37 detects a synchronizing word, it outputs a post-stage frame synchronization detecting signal indicating the detected synchronizing word and a frame-added electric signal whose frame has been synchronized. Inasmuch as the frame-added electric signal reproduced by FEC decoder 22 has reduced bit errors, post-stage synchronizing word detecting circuit 37 can detect a synchronizing word stably and quickly.

Based on the post-stage frame synchronization detecting signal from post-stage synchronizing word detecting circuit 37, post-stage frame synchronization detecting circuit 36 determines whether or not the number of successive synchronizing words whose bit errors are equal to or smaller than the allowable value, among the synchronizing words included in the frame-added electric signal reproduced by FEC decoder 22, has reached a prescribed number in a predetermined number of frames subsequent to the frame whose synchronizing word has been detected by pre-stage synchronizing word detecting circuit 31.

For example, post-stage frame synchronization detecting circuit 36 includes a post-stage frame synchronization protection counter, not shown. Post-stage frame synchronization detecting circuit 36 counts the number of successive synchronizing words that use the post-stage synchronization protection counter, and determines whether or not the counted number of successive synchronizing words has reached the prescribed number within a given number of frames. If the allowable value is 0, then post-stage frame synchronization detecting circuit 36 counts the number of successive frames whose synchronizing words have no bit error. The prescribed number referred to above may also be referred to as a frame synchronization detection protection step number.

If the number of successive synchronizing words has reached the prescribed number, then post-stage frame synchronization detecting circuit 36 decides that the positions of the synchronizing words are correct, and sends the decision to receiver frame synchronization display output circuit 35. In this case, pre-stage synchronizing word detecting circuit 31 continues to interrupt the process of searching for a synchronizing word.

If the number of successive synchronizing words has not reached the prescribed number, then post-stage frame synchronization detecting circuit 36 decides that the positions of the synchronizing words are not correct, and causes pre-stage synchronizing word detecting circuit 31 to resume the process of detecting a synchronizing word.

When receiver frame synchronization display output circuit 35 receives the decision indicating that the positions of the synchronizing words are correct from post-stage frame synchronization detecting circuit 36, it makes a receiver frame synchronization display signal high, i.e., it brings a receiver frame synchronization display signal into a high state, which is a frame synchronization established state indicating that frame synchronization has been established, thereby establishing frame synchronization. When the receiver frame synchronization display signal is brought into a high state, frame terminating circuit 21 removes the synchronizing word from the frame-added electric signal from post-stage synchronizing word detecting circuit 37, and reproduces and outputs a data signal.

According to the present exemplary embodiment, as described above, since frame synchronization is established based on the number of successive synchronizing words whose bit errors are equal to or smaller than the allowable value, among the synchronizing words included in the frame-added electric signal whose errors have been corrected, it is possible to activate a frame synchronization established state with ease even in the event that many bit errors are caused in the transmission link. Consequently, it is possible to output a data signal quickly and also to resume the detection of synchronizing words quickly.

In FIG. 4, post-stage frame synchronization detecting circuit 36 counts the number of successive synchronizing words based on the synchronizing words detected by post-stage synchronizing word detecting circuit 37. However, since the position of a synchronizing word has been detected by pre-stage synchronizing word detecting circuit 31, post-stage frame synchronization detecting circuit 36 may compare the synchronizing word in a frame-added electric signal whose errors have been corrected and a predetermined reference synchronizing word based on the detected position, and count the number of successive synchronizing words whose bit errors are equal to or smaller than the allowable value, using the post-stage synchronization protection counter. In such a modification, post-stage synchronizing word detecting circuit 37 is dispensed with.

Figure 15:
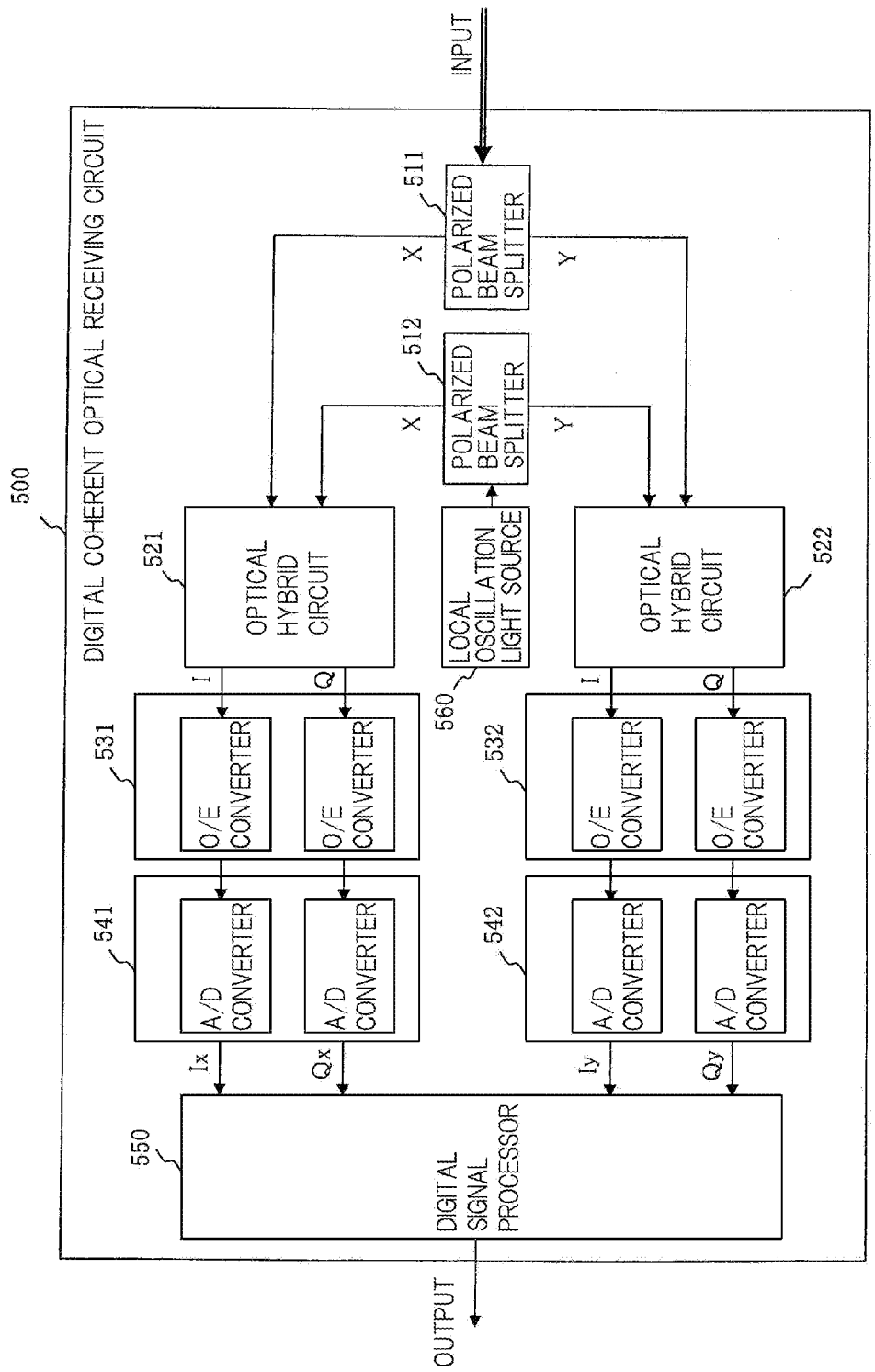
FIG. 15 is a block diagram showing the configuration of an optoelectrical converting circuit according to an exemplary embodiment of the present invention.

FIG. 15 is a block diagram showing a digital coherent optical receiving circuit as an example of optoelectrical converting circuit 25 included in optical receiving apparatus 20 of optical transceiving system shown in FIG. 4. In this example, an optical signal output from electrooptical converting circuit 15 is a digital coherent optical signal.

As shown in FIG. 15, digital coherent optical receiving circuit 500 includes polarized beam splitters 511, 512, optical hybrid circuits 521, 522, O/E converters 531, 532, A/D converters 541, 542, digital signal processor 550, and local oscillation light source 560.

Polarized beam splitters 511, 512 separate a light beam into two polarized light beams having respective polarized directions perpendicular to each other. Optical hybrid circuits 521, 522 generate an I-component signal and a Q-component signal from a light beam. O/E converters 531, 532 convert an optical signal into an electric signal. A/D converters 541, 542 convert an analog signal into a digital signal. Digital signal processor 550 performs digital processing on a digital signal to reproduce an original signal. Local oscillation light source 560 oscillates at an oscillation frequency which is the same as or substantially the same as the frequency of the optical signal that is input to digital coherent optical receiving circuit 500, thereby generating and outputting a reference optical signal.

Digital coherent optical receiving circuit 500 thus constructed operates as follows: When an optical signal is input to polarized beam splitter 511, the input optical signal is separated thereby into two polarized light beams having respective polarized directions (X and Y directions) perpendicular to each other. The reference optical signal output from local oscillation light source 560 is separated by polarized beam splitter 512 into two polarized light beams having respective polarized directions (X and Y directions) perpendicular to each other.

Of the polarized light beams that are generated by polarized beam splitters 511, 512, two polarized light beams having the same polarized direction are combined in phase and in opposite phase by each of optical hybrid circuits 521, 522, and converted into an I-component signal and a Q-component signal.

The sets of the I-component signal and the Q-component signal are converted into electric signals by O/E converters 531, 532, and the electric signals are then converted by A/D converters 541, 542 into respective sets of an I-component electric signal and a Q-component electric signal as digital signals. Digital signal processor 550 performs digital processing on the sets of the I-component electric signal and the Q-component electric signal to reproduce the original signal.

Digital coherent optical receiving circuit 500 shown in FIG. 15 is also applicable to optoelectrical converting circuits according to exemplary embodiments to be described later.

Figure 5:
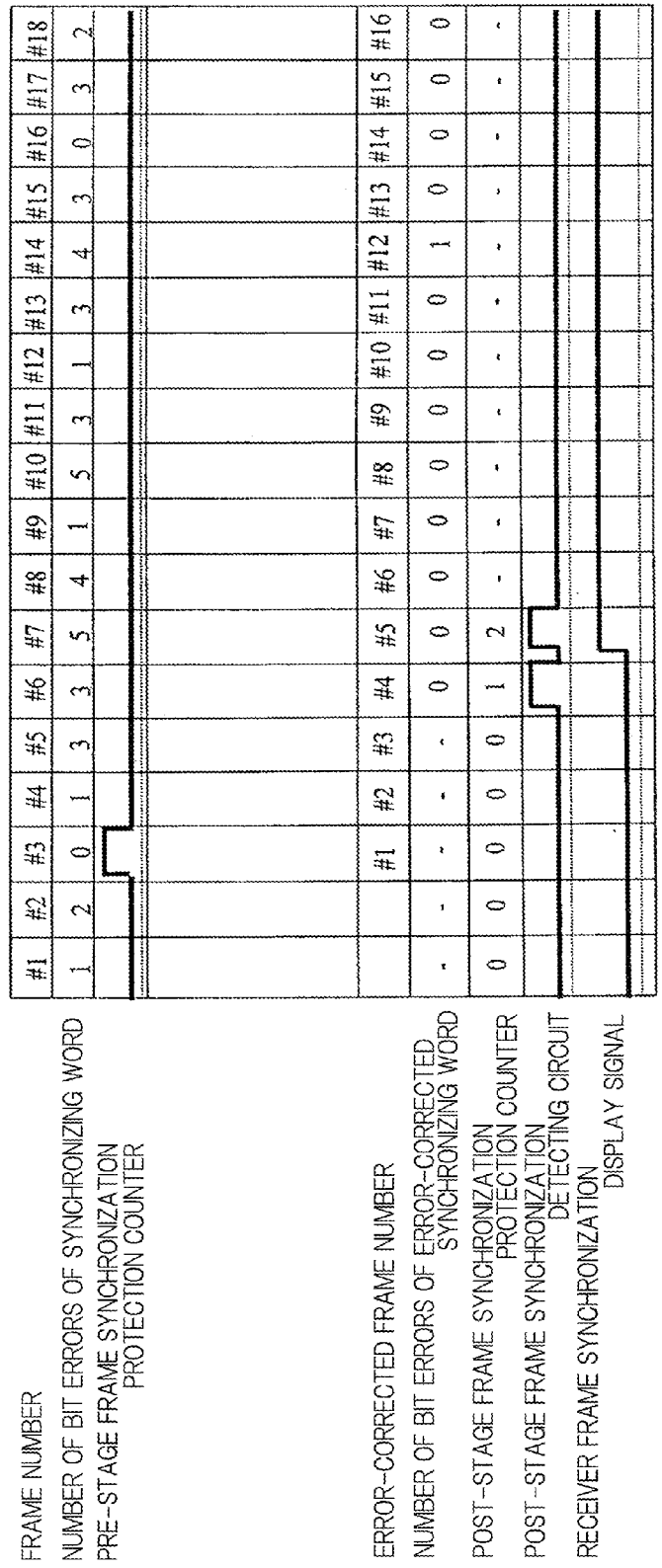
FIG. 5 is a timing chart illustrative of an example of operation of an optical receiving apparatus.

FIG. 5 is a timing chart illustrative of an example of operation of the optical receiving apparatus shown in FIG. 4. In FIG. 5, the allowable value, the frame synchronization detection protection step number, and the predetermined number in pre-stage synchronizing word detecting circuit 31 and post-stage synchronizing word detecting circuit 37 are set to 0, 2, and 3, respectively. However, these numerical values are given by way of example only, and can be changed.

In FIG. 5, pre-stage synchronizing word detecting circuit 31 detects a synchronizing word with 0 bit error in a frame having frame number #3, outputs a pre-stage frame synchronization detecting signal, and interrupts the process for detecting a synchronizing word. FEC decoder 22 starts to perform the error correcting process on an error-correcting-code-added electric signal, and post-stage synchronizing word detecting circuit 37 starts to detect a synchronizing word.

Post-stage frame synchronization detecting circuit 36 determines whether the number of successive synchronizing words whose bit errors are equal to or smaller than the allowable value, from frames subsequent to frame number #3 of the frame-added electric signal whose errors have been corrected. Each time post-stage frame synchronization detecting circuit 36 decides that there are successive synchronizing words whose bit errors are equal to or smaller than the allowable value, it outputs a post-stage frame synchronization detecting signal and counts up the synchronization protection counter. As there are two successive synchronizing words free of a bit error, the frame synchronization detection protection step number reaches 2 within three frames, including the frame having frame number #3, from the frame having frame number #3 whose errors have been corrected. Therefore, post-stage frame synchronization detecting circuit 36 decides that the position of the synchronizing word is correct in a frame having frame number #5 whose errors have been corrected. Receiver frame synchronization display output circuit 35 then makes the receiver frame synchronization display signal high.

If post-stage frame synchronization detecting circuit 36 does not decide that frame synchronization is not established within a predetermined frame after pre-stage synchronizing word detecting circuit 31 has output the pre-stage frame synchronization detecting signal, then post-stage frame synchronization detecting circuit 36 causes pre-stage synchronizing word detecting circuit 31 to start to detect a synchronizing word again.

Exemplary Embodiment 2

Figure 6:
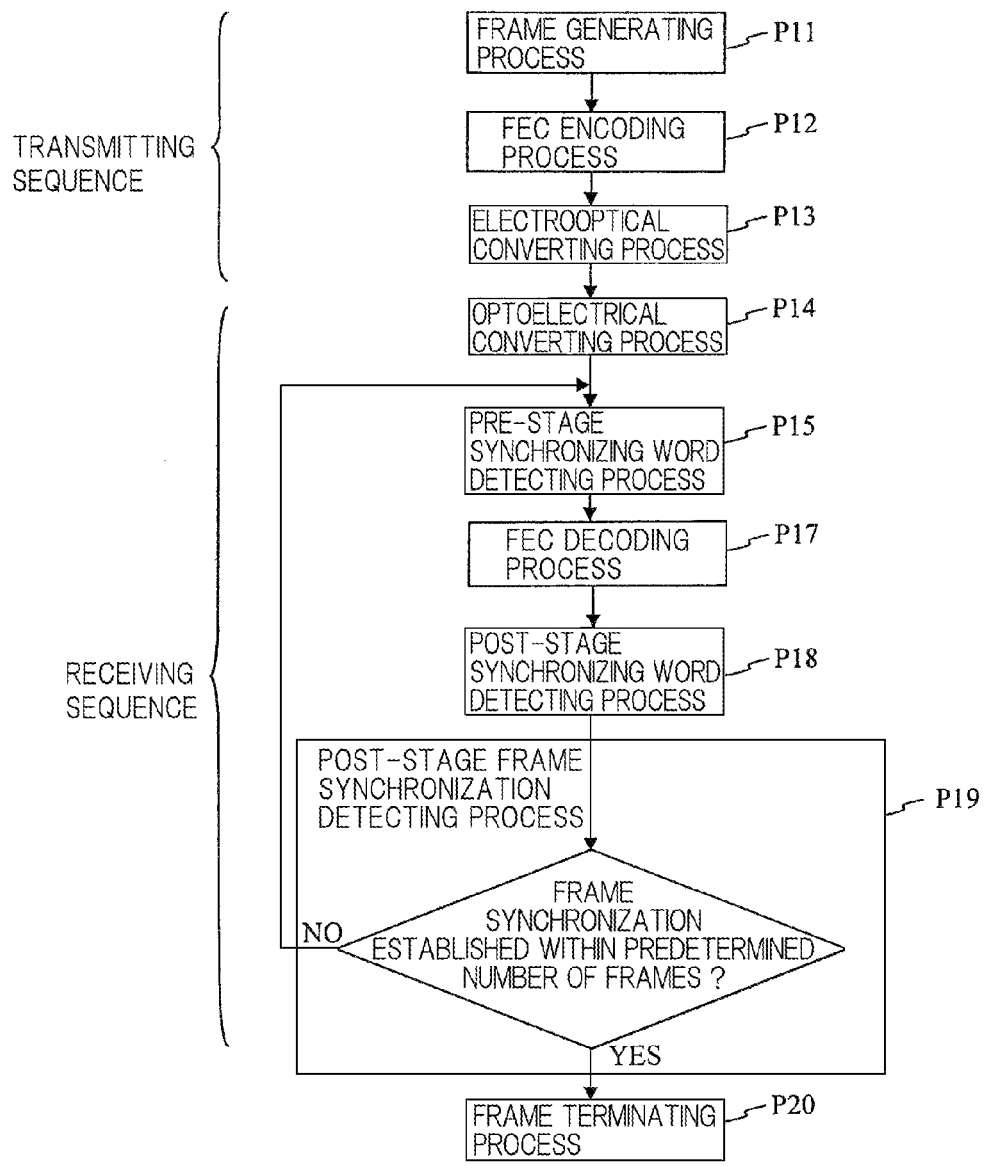
FIG. 6 is a flowchart of an optical transceiving method according to an exemplary embodiment of the present invention.

FIG. 6 is a flowchart of an optical transceiving method according to the present exemplary embodiment of the present invention. The optical transceiving method includes a transmitting sequence (P11 through P13) for transmitting an optical signal and a receiving sequence (P14 through P20) for receiving an optical signal.

According to the transmitting sequence, a synchronizing word is added to a data signal, generating a frame-added electric signal (frame generating process P11). Thereafter, an error correcting code is added to the frame-added electric signal, generating an error-correcting-code-added electric signal (FEC encoding process P12). The error-correcting-code-added electric signal is then converted into an optical signal, which is transmitted (electrooptical converting process P13).

According to the receiving sequence, the optical signal transmitted in electrooptical converting sequence P13 is received and optoelectrically converted to reproduce the error-correcting-code-added electric signal (optoelectrical converting process P14). Then, a synchronizing word included in the error-correcting-code-added electric signal is detected, and an error-correcting-code-added electric signal whose frame has been synchronized is output (pre-stage synchronizing word detecting process P15).

Thereafter, an error correcting process is performed on the error-correcting-code-added electric signal whose frame has been synchronized, reproducing the frame-added electric signal (FEC decoding process P17). Then, a synchronizing word included in the reproduced frame-added electric signal is detected, and a frame-added electric signal whose frame has been synchronized is output (post-stage synchronizing word detecting process P18).

It is determined whether or not the number of successive synchronizing words whose bit errors are equal to or smaller than the allowable value, among the synchronizing words included in the frame-added electric signal whose frame has been synchronized, has reached a prescribed number in a predetermined number of frames subsequent to the frame whose synchronizing word has been detected in pre-stage synchronizing word detecting process P15 (post-stage frame synchronization detecting process P19).

If the number of successive synchronizing words has not reached the prescribed number, then control goes back to process P15.

If the number of successive synchronizing words has reached the prescribed number, then it is decided that the positions of the synchronizing words are correct, and the synchronizing words are removed from the frame-added electric signal whose frame synchronization has been established, thereby reproducing the data signal (frame terminating process P20).

According to the present exemplary embodiment, as described above, since frame synchronization is established based on the number of successive synchronizing words whose bit errors are equal to or smaller than the allowable value, among the synchronizing words included in the frame-added electric signal whose errors have been corrected, it is possible to activate a frame synchronization established state with ease even in the event that many bit errors are caused in the transmission link. Consequently, it is possible to output a data signal quickly and also to resume the detection of synchronizing words quickly.

Exemplary Embodiment 3

Figure 7:
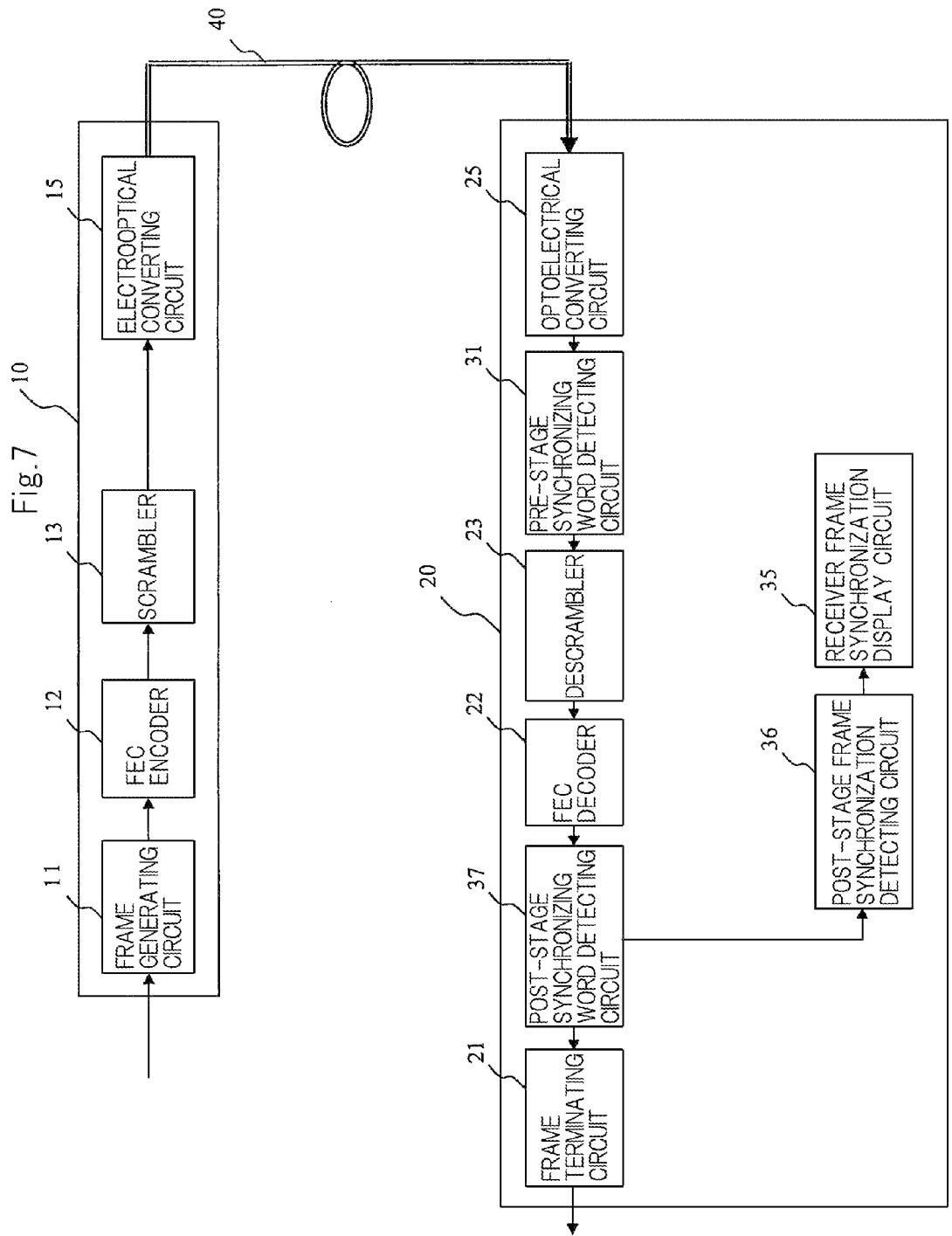
FIG. 7 is a block diagram showing the configuration of an optical transceiving system according to an exemplary embodiment of the present invention.

FIG. 7 is a block diagram showing the configuration of an optical transceiving system according to the exemplary embodiment of the present invention. The optical transceiving system shown in FIG. 7 is different from the optical transceiving system shown in FIG. 4 in that optical transmitting apparatus 10 further includes scrambler 13 added between FEC encoder 12 and electrooptical converting circuit 15, and optical receiving apparatus 20 further includes descrambler 23 added between pre-stage synchronizing word detecting circuit 31 and FEC decoder 22.

Scrambler 13 of optical transmitting apparatus 10 scrambles the error-correcting-code-added electric signal from FEC encoder 12 by using a pseudo-random signal. The scrambling process is effective to prevent the error-correcting-code-added electric signal from having a succession of identical signs such as "0" or "1" or to equalize the probabilities that "0" and "1" will appear. Descrambler 23 of optical receiving apparatus 20 restores the original error-correcting-code-added electric signal from the scrambled error-correcting-code-added electric signal. The optical transceiving system according to the present exemplary embodiment offers the same advantages as exemplary embodiment 1 even with scrambler 13 and descrambler 23 added.

Exemplary Embodiment 4

Figure 8:
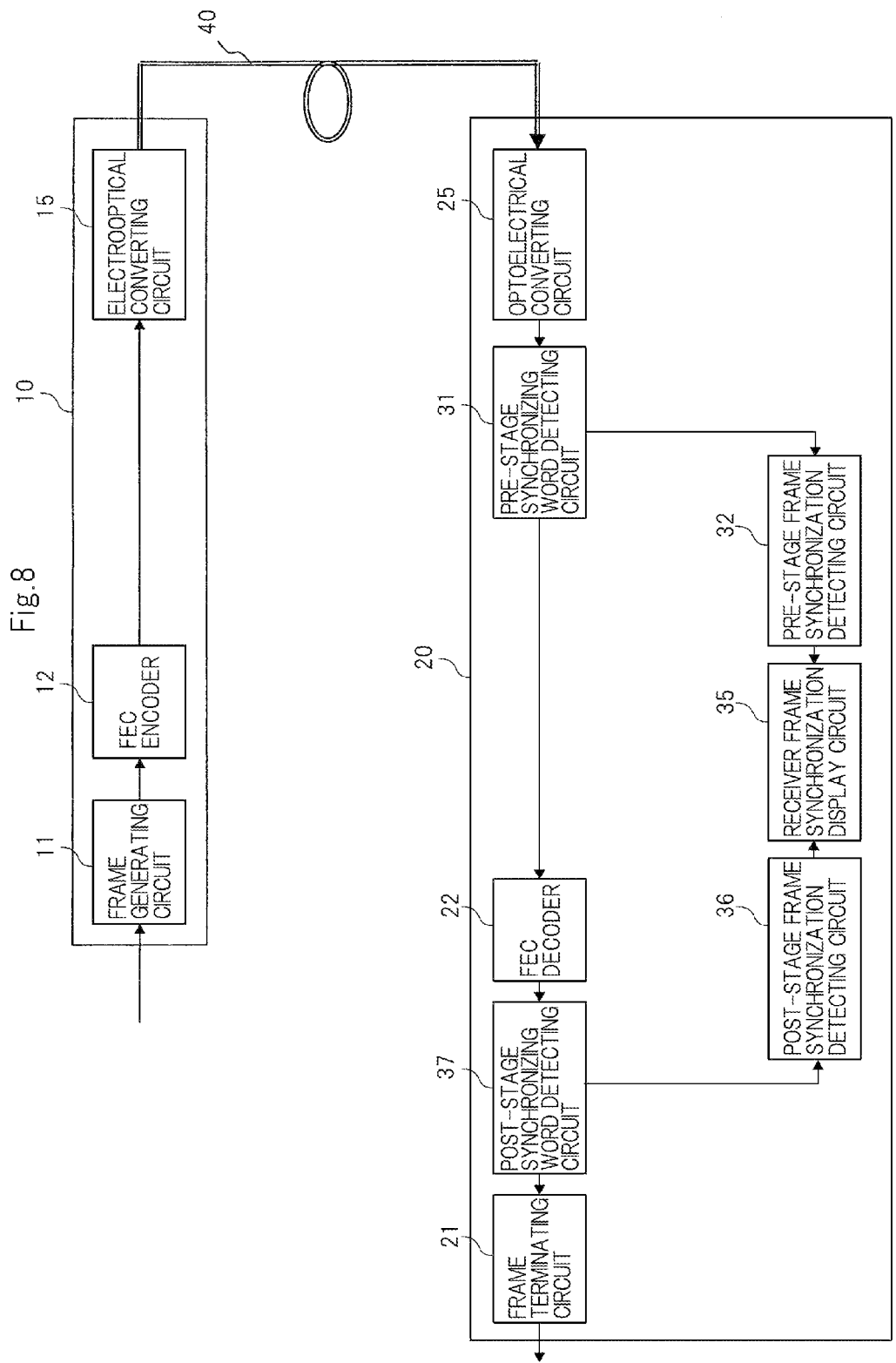
FIG. 8 is a block diagram showing the configuration of an optical transceiving system according to an exemplary embodiment of the present invention.

FIG. 8 is a block diagram showing the configuration of an optical transceiving system according to the exemplary embodiment of the present invention. The optical transceiving system shown in FIG. 8 is different from the optical transceiving system shown in FIG. 4 in that optical receiving apparatus 20 further includes pre-stage frame synchronization detecting circuit 32.

Pre-stage frame synchronization detecting circuit 32 determines whether or not the number of successive synchronizing words whose bit errors are equal to or smaller than the allowable value, among the synchronizing words detected by pre-stage synchronizing word detecting circuit 31, has reached a prescribed number. For example, pre-stage frame synchronization detecting circuit 32 includes a pre-stage synchronization protection counter, not shown. Pre-stage frame synchronization detecting circuit 32 counts the number of successive synchronizing words using the pre-stage synchronization protection counter, and determines whether or not the counted number of successive synchronizing words has reached the prescribed number.

If the number of successive synchronizing words has reached the prescribed number, then pre-stage frame synchronization detecting circuit 32 decides that provisional frame synchronization has been established, and makes a provisional frame synchronization display signal high and causes pre-stage synchronizing word detecting circuit 31 to interrupt the process of detecting a synchronizing word.

If provisional frame synchronization has been established, then FEC decoder 22 starts to perform the error correcting process on the error-correcting-code-added electric signal.

According to the present exemplary embodiment, as described above, inasmuch as the error correcting process starts to be performed on the synchronizing words whose bit errors are equal to or smaller than the allowable value, the optical transceiving system can be applied to transmission links with more bit errors. When the number of successive synchronizing words whose bit errors are equal to or smaller than the allowable value has reached the prescribed number, it is decided that provisional frame synchronization has been established. Therefore, the accuracy with which to establish provisional frame synchronization is increased. After provisional frame synchronization has been established, post-stage frame synchronization detecting circuit 36 determines whether or not frame synchronization has been established.

The allowable value for bit errors which is used by pre-stage frame synchronization detecting circuit 32 (hereinafter also referred to as a pre-allowable value) should preferably be greater than the allowable value for bit errors which is used by post-stage frame synchronization detecting circuit 36 (hereinafter also referred to as a post-allowable value). With the pre-allowable value being greater than the post-allowable value for detecting synchronizing words from electric signals whose errors have not been corrected, pre-stage frame synchronization detecting circuit 32 can quickly activate a provisional frame synchronization established state.

The prescribed number to be compared with the number of successive synchronizing words by post-stage frame synchronization detecting circuit 36 (hereinafter also referred to as a pre-prescribed number) should preferably be greater than the prescribed number to be compared with the number of successive synchronizing words by pre-stage frame synchronization detecting circuit 32 (hereinafter also referred to as a post-prescribed number). With the post-prescribed number being greater than the pre-prescribed number for detecting synchronizing words from electric signals whose errors have not been corrected, pre-stage synchronizing word detecting circuit 31 prevents erroneous synchronization from occurring.

Receiver frame synchronization display output circuit 35 may control each circuits to be operated in the provisional frame synchronization established state and each circuits to be operated in the frame synchronization established state.

Figure 9:
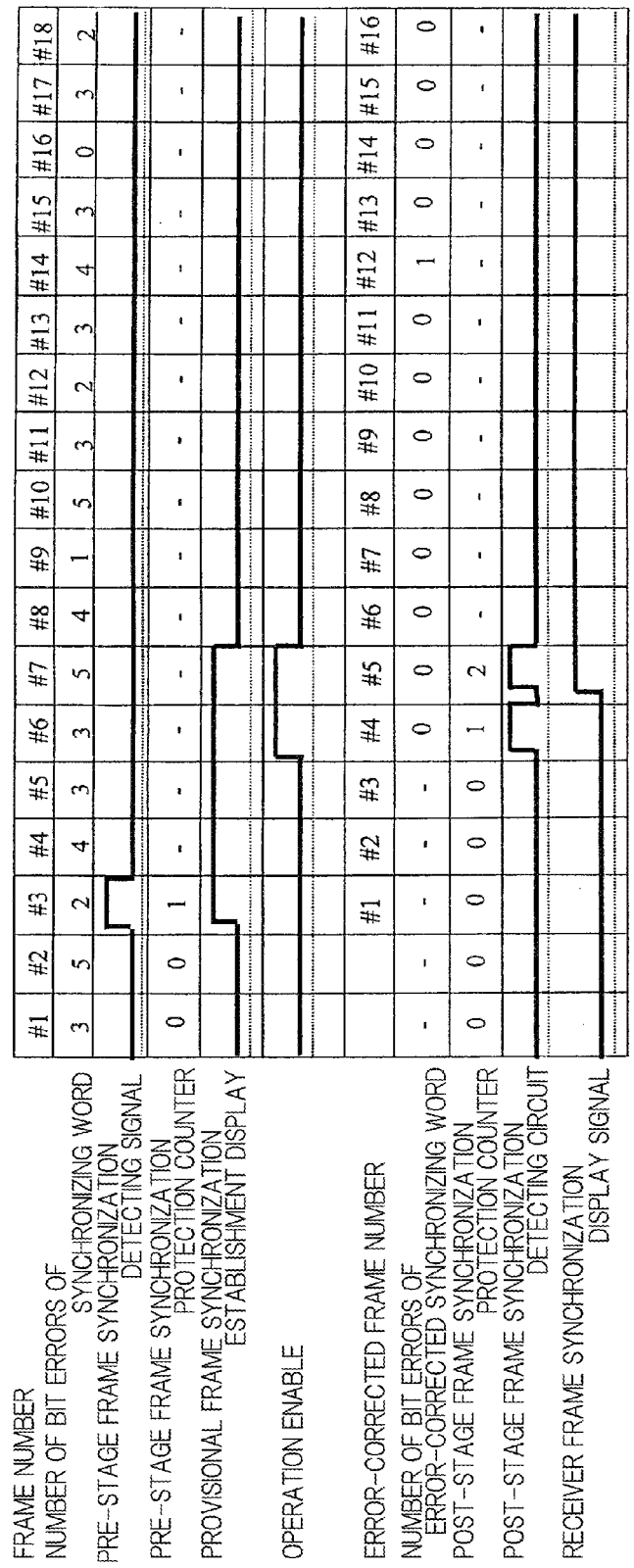
FIG. 9 is a timing chart illustrative of operation of an optical receiving apparatus.

FIG. 9 is a timing chart illustrative of operation of the optical receiving apparatus shown in FIG. 8. In FIG. 9, the pre-allowable value, the pre-stage frame synchronization detection protection step number (pre-prescribed number), the post-allowable value, and the post-stage frame synchronization detection protection step number (post-prescribed number) are set to 2, 1, 0, and 3, respectively. However, these numerical values are provided by way of example only, and can be changed.

In FIG. 9, in a frame having frame number #3, pre-stage frame synchronization detecting circuit 32 detects a synchronizing word with 2 bit errors, and the frame synchronization protection counter counts 1, establishing provisional frame synchronization. In view of the delay times of signal processing processes carried out by FEC decoder 22 and post-stage synchronizing word detecting circuit 37, pre-stage frame synchronization detecting circuit 32 activates an operation enable state for operating FEC decoder 22 and post-stage synchronizing word detecting circuit 37 from a frame that has frame number #6.

In the operation enable state, post-stage frame synchronization detecting circuit 36 starts protecting synchronizing words. Post-stage frame synchronization detecting circuit 36 detects a synchronizing word free of any bit error in each frame having frame numbers #4, #5 whose errors have been corrected. Each time post-stage frame synchronization detecting circuit 36 detects such a synchronizing word, it outputs a post-stage frame synchronization detecting signal. The frame synchronization protection counter then counts 2, establishing frame synchronization. Receiver frame synchronization display output circuit 35 then makes the receiver frame synchronization display signal high.

Exemplary Embodiment 5

Figure 10:
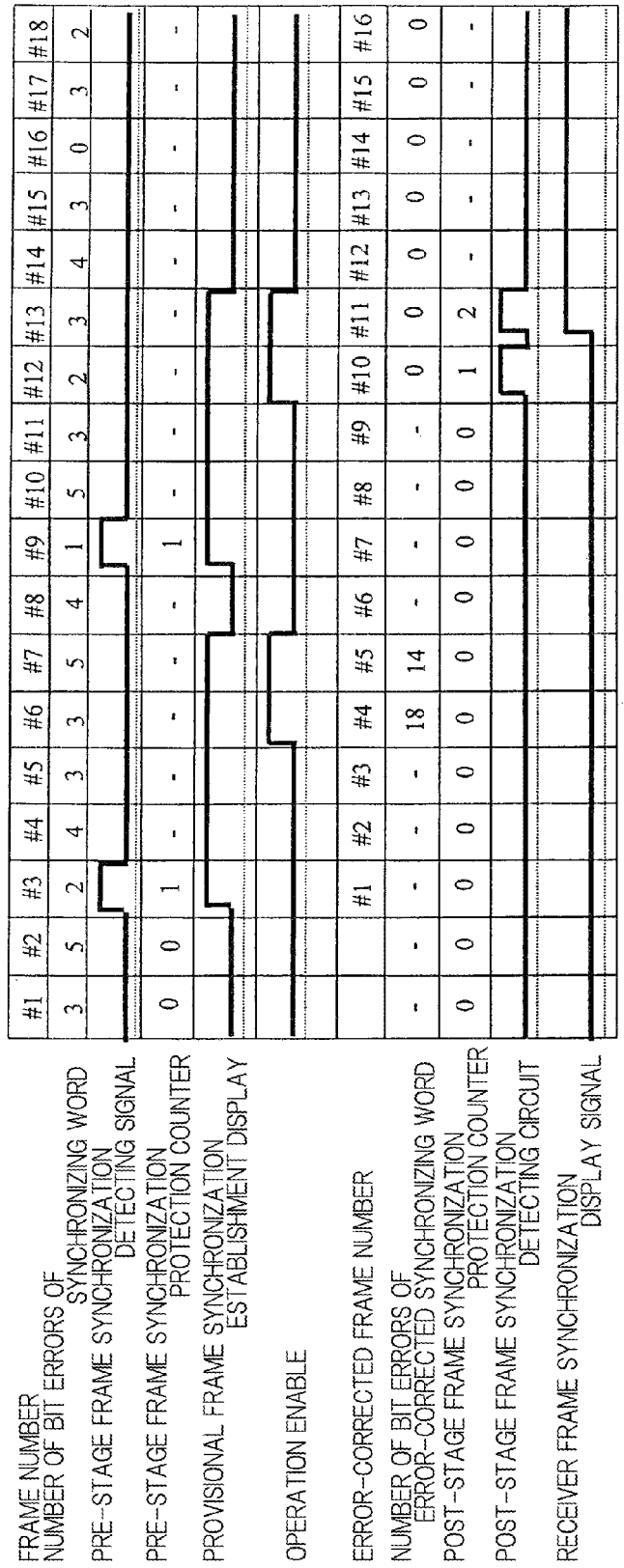
FIG. 10 is a timing chart illustrative of operation of an optical receiving apparatus.

An optical transceiving system according to the exemplary embodiment of the present invention has the same configuration as the optical transceiving system shown in FIG. 8. FIG. 10 is a timing chart illustrative of operation of an optical receiving apparatus included in the optical transceiving system according to the exemplary embodiment.

In FIG. 10, the optical receiving apparatus operates in the same manner as exemplary embodiment 4 until pre-stage frame synchronization detecting circuit 32 activates an operation enable state in a frame having frame number #6.

In the frames having frame numbers #4, #5 whose errors have been corrected, however, even when post-stage synchronizing word detecting circuit 37 detects synchronizing words, since the bit errors of those synchronizing words exceed the allowable value, post-stage frame synchronization detecting circuit 36 does not judge the establishment of frame synchronization within a predetermined number of frames. If pre-stage frame synchronization detecting circuit 32 activates an operation enable state in frames having frame numbers #6, #7, frame synchronization may be judged at the wrong positions, and hence erroneous synchronization may be established.

As regards establishment of frame synchronization within the predetermined number of frames, post-stage frame synchronization detecting circuit 36 causes pre-stage synchronizing word detecting circuit 31 to start the process of detecting a synchronizing word.

Pre-stage synchronizing word detecting circuit 31 starts searching for a synchronizing word, and detects a synchronizing word in a frame having frame number #9. Pre-stage frame synchronization detecting circuit 32 decides that the synchronizing word has 2 bit errors which are equal to the prescribed value, and activates a provisional frame synchronization established state. Pre-stage frame synchronization detecting circuit 32 activates an operation enable state from a frame having frame number #12.

When the operation enable state is activated, post-stage frame synchronization detecting circuit 36 detects synchronizing words free of any bit error in respective frames having frame numbers #10, #11 whose errors have been corrected. Each time post-stage frame synchronization detecting circuit 36 detects a synchronizing word, it outputs a post-stage frame synchronization detecting signal. Then, the frame synchronization protection counter counts 2, establishing provisional frame synchronization. Receiver frame synchronization display output circuit 35 makes the receiver frame synchronization display signal high.

According to the present exemplary embodiment, as described above, if post-stage frame synchronization detecting circuit 36 counts the number of successive synchronizing words whose bit errors are equal to or smaller than the allowable value, among the synchronizing words included in the frame-added electric signal from FEC decoder 22, and if the counted number has not reached the prescribed number within the predetermined number of frames when pre-stage synchronizing word detecting circuit 31 detects a synchronizing word, i.e., if no frame synchronization established state is activated within the predetermined number of frames, then post-stage frame synchronization detecting circuit 36 causes pre-stage synchronizing word detecting circuit 31 to start detecting a synchronizing word again. Therefore, optical receiving apparatus 20 prevents erroneous synchronization and easily activates the frame synchronization established state.

Exemplary Embodiment 6

Figure 11:
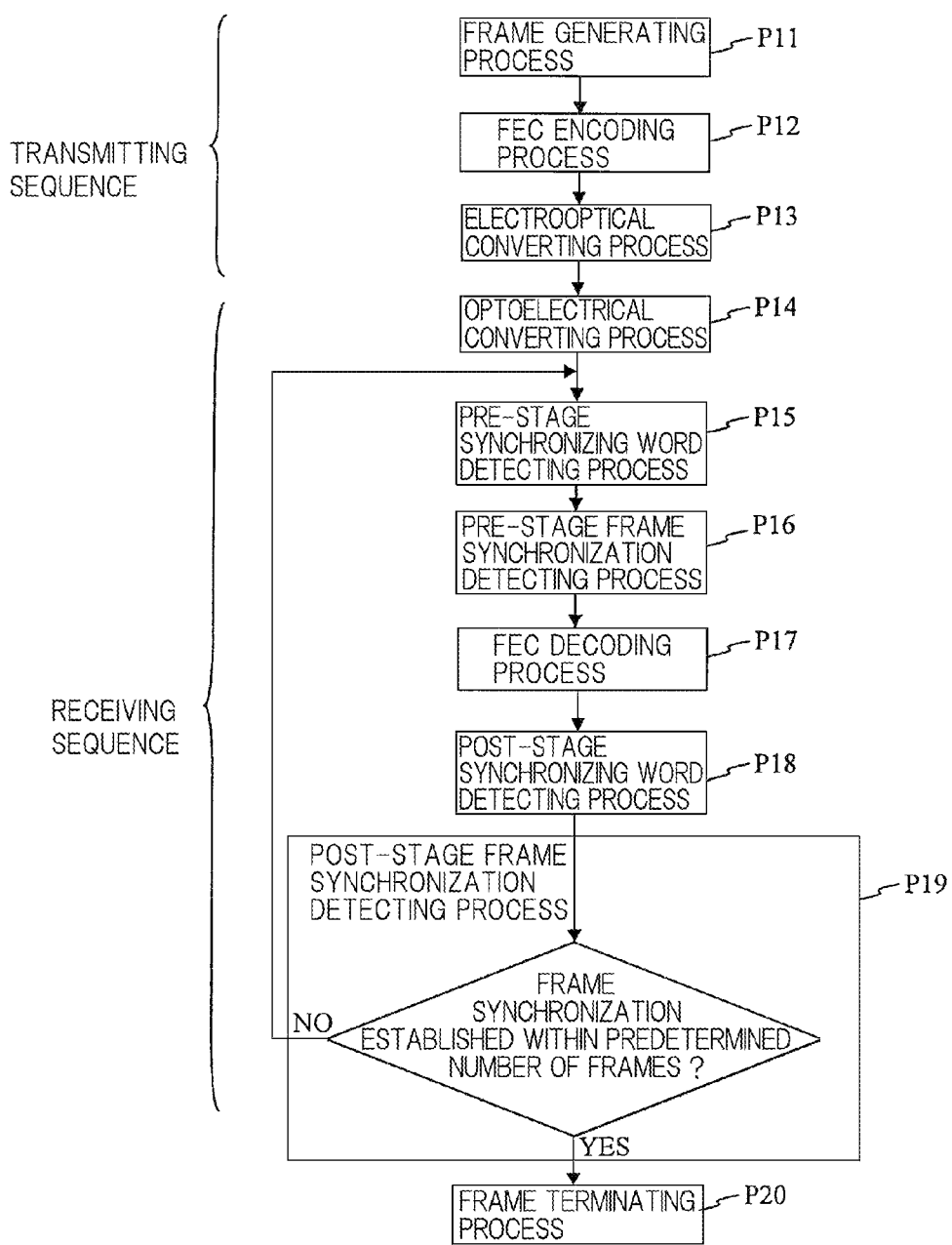
FIG. 11 is a diagram illustrative of optical transceiving sequences according to an exemplary embodiment of the present invention.

FIG. 11 is a diagram illustrative of an optical transceiving method according to the exemplary embodiment of the present invention.

The optical transceiving method includes a transmitting sequence (P11 through P13) for transmitting an optical signal and a receiving sequence (P14 through P20) for receiving an optical signal.

According to the transmitting sequence, a synchronizing word is added to a data signal, generating a frame-added electric signal (frame generating process P11). Thereafter, an error correcting code is added to the frame-added electric signal, generating an error-correcting-code-added electric signal (FEC encoding process P12). The error-correcting-code-added electric signal is then converted into an optical signal, which is transmitted (electrooptical converting process P13).

According to the receiving sequence, the optical signal transmitted in electrooptical converting sequence P13 is received and optoelectrically converted back into the error-correcting-code-added electric signal (optoelectrical converting process P14). Then, a synchronizing word included in the error-correcting-code-added electric signal is detected, and an error-correcting-code-added electric signal whose frame has been synchronized is output (pre-stage synchronizing word detecting process P15).

If the number of successive synchronizing words whose bit errors are equal to or smaller than the allowable value, among the synchronizing words detected in pre-stage synchronizing word detecting process P15, has reached the prescribed number, then provisional frame synchronization is established (pre-stage frame synchronization detecting process P16).

Thereafter, an error correcting process is performed on the error-correcting-code-added electric signal whose frame has been synchronized, reproducing the frame-added electric signal (FEC decoding process P17). Then, a synchronizing word included in the reproduced frame-added electric signal is detected, and a frame-added electric signal whose frame has been synchronized is output (post-stage synchronizing word detecting process P18).

It is determined whether or not the number of successive synchronizing words whose bit errors are equal to or smaller than the allowable value, among the synchronizing words included in the frame-added electric signal whose frame has been synchronized, has reached a prescribed number in a predetermined number of frames subsequent to the frame whose synchronizing word has been detected in pre-stage synchronizing word detecting process P15 (post-stage frame synchronization detecting process P19).

If the number of successive synchronizing words has not reached the prescribed number, then control goes back to process P15.

If the number of successive synchronizing words has reached the prescribed number, then it is decided that the positions of the synchronizing words are correct, and the synchronizing words are removed from the frame-added electric signal whose frame synchronization has been established, thereby reproducing the data signal (frame terminating process P20).

The difference from exemplary embodiment 2 lies in the fact that, as shown in FIG. 11, pre-stage frame synchronization detecting process P16 is added after pre-stage synchronizing word detecting process P15.

More specifically, in pre-stage frame synchronization detecting process P16, when the counted number of successive synchronizing words whose bit errors are equal to or smaller than the allowable value, among the synchronizing words detected in pre-stage synchronizing word detecting process P15, has reached the prescribed number, provisional frame synchronization is judged as being established, and the provisional frame synchronization display signal is made high and the process of detecting a synchronizing word is interrupted. When the provisional frame synchronization display signal is made high, FEC decoding process P17 is started.

According to the present exemplary embodiment, as described above, inasmuch as a synchronizing word is detected if the bit errors of the synchronizing words detected in pre-stage synchronizing word detecting process P15 are equal to or smaller than the allowable value, the optical transceiving method can be applied to transmission links with more bit errors. When the number of successive synchronizing words whose bit errors are equal to or smaller than the allowable value has reached the prescribed number, it is decided that provisional frame synchronization has been established. Therefore, the accuracy with which to establish provisional frame synchronization is increased. After provisional frame synchronization has been established, post-stage frame synchronization detecting process P19 determines whether or not frame synchronization has been established.

In FIG. 11, post-stage frame synchronization detecting process P19 counts the number of successive synchronizing words whose bit errors are equal to or smaller than the allowable value from the synchronizing words detected in post-stage synchronizing word detecting process P18. However, since the position of a synchronizing word has already been detected in pre-stage synchronizing word detecting process P15, post-stage frame synchronization detecting process P19 may compare the synchronizing word in a frame-added electric signal whose errors have been corrected and a predetermined reference synchronizing word based on the detected position, and count the number of successive synchronizing words whose bit errors are equal to or smaller than the allowable value. In such a modification, post-stage synchronizing word detecting process P18 is dispensed with.

Since post-stage frame synchronization detecting process P19 counts the number of successive synchronizing words whose bit errors are equal to or smaller than the allowable value based on the frame-added electrical signal whose errors have been corrected in FEC decoding process P17, it is possible to activate a frame synchronization established state with ease even in the event that bit errors caused in the transmission link. Consequently, it is possible to output a data signal quickly and also to resume the detection of synchronizing words quickly.

The allowable value for bit errors which is used in pre-stage frame synchronization detecting process P16 should preferably be greater than the allowable value for bit errors which is used in post-stage frame synchronization detecting process P19. With these allowable values, a provisional frame synchronization established state can quickly be activated. The allowable value for bit errors which is used in pre-stage frame synchronization detecting process P16 is set to 2, and the allowable value for bit errors which is used in post-stage frame synchronization detecting process P19 is set to 0, for example. However, these numerical values are given by way of example only, and can be changed.

The prescribed number to be compared with the number of successive synchronizing words in post-stage frame synchronization detecting process P19 should preferably be greater than the prescribed number to be compared with the number of successive synchronizing words in pre-stage frame synchronization detecting process P16. With these prescribed numbers, since a synchronizing word is detected from an electric signal whose errors have been corrected, erroneous synchronization is prevented from occurring. The prescribed number to be compared with the number of successive synchronizing words in post-stage frame synchronization detecting process P19 is set to 2, and the prescribed number to be compared with the number of successive synchronizing words in pre-stage frame synchronization detecting process P16 is set to 1, for example. However, these numerical values are provided by way of example only, and can be changed.

Exemplary Embodiment 7

Figure 12:
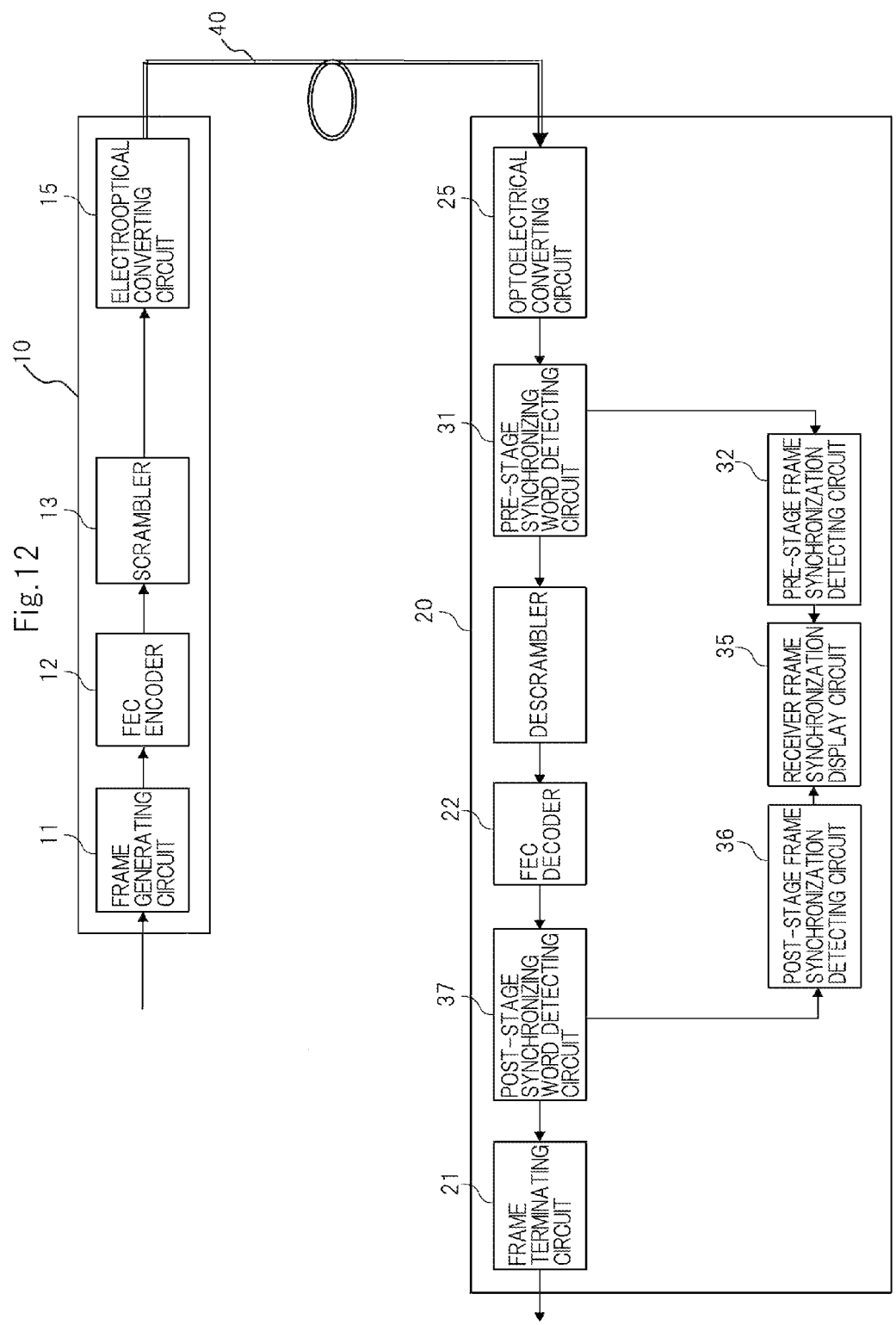
FIG. 12 is a block diagram showing the configuration of an optical transceiving system according to an exemplary embodiment of the present invention.

FIG. 12 is a block diagram showing the configuration of an optical transceiving system according to the exemplary embodiment of the present invention. The optical transceiving system shown in FIG. 12 is different from the optical transceiving system according to exemplary embodiment 4 shown in FIG. 8 in that optical transmitting apparatus 10 further includes scrambler 13 added between FEC encoder 12 and electrooptical converting circuit 15 and optical receiving apparatus 20 further includes descrambler 23 added between pre-stage synchronizing word detecting circuit 31 and FEC decoder 22.

Scrambler 13 of optical transmitting apparatus 10 scrambles the error-correcting-code-added electric signal from FEC encoder 12 using a pseudo-random signal. The scrambling process is effective to prevent the error-correcting-code-added electric signal from having a succession of identical signs such as "0" or "1" or to equalize the probabilities that "0" and "1" will appear. Descrambler 23 of optical receiving apparatus 20 restores the original error-correcting-code-added electric signal from the scrambled error-correcting-code-added electric signal. The optical transceiving system according to the present exemplary embodiment offers the same advantages as exemplary embodiment 4 even with scrambler 13 and descrambler 23 added.

Exemplary Embodiment 8

Figure 13:
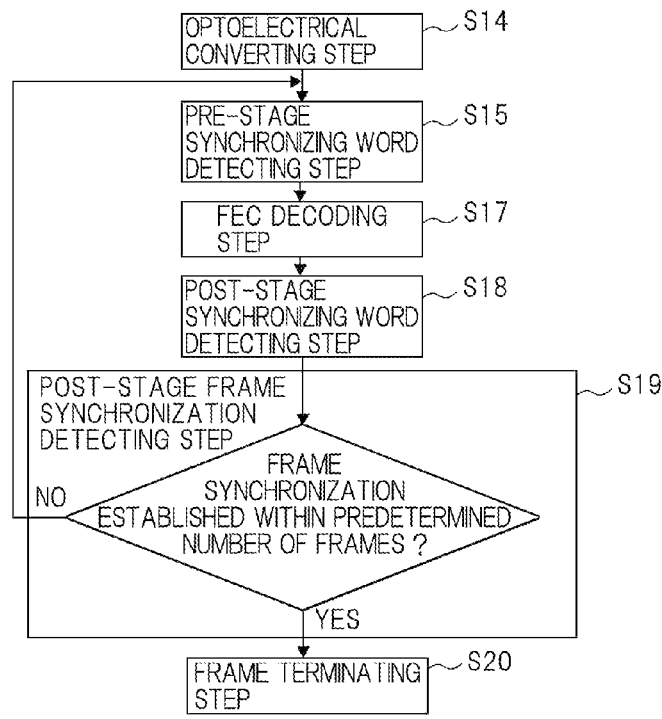
FIG. 13 is a flowchart of an optical receiving program to be executed by a computer according to an exemplary embodiment of the present invention.

FIG. 13 is a flowchart of an optical receiving sequence (steps S14, S15, S17 through S20) to be executed by a computer under the control of an optical receiving program according to the present exemplary embodiment of the present invention.

According to the optical receiving sequence, an optical signal is received and optoelectrically converted to reproduce an error-correcting-code-added electric signal (optoelectrical converting step S14). Then, a synchronizing word included in the error-correcting-code-added electric signal is detected, and an error-correcting-code-added electric signal whose frame has been synchronized is output (pre-stage synchronizing word detecting step S15).

Thereafter, if the number of successive synchronizing words whose bit errors are equal to or smaller than the allowable value, among the synchronizing words detected in pre-stage synchronizing word detecting step S15, provisional frame synchronization is established (pre-stage frame synchronization detecting step S16).

An error correcting process is performed on the error-correcting-code-added electric signal whose frame has been synchronized, reproducing the frame-added electric signal (FEC decoding step S17). Then, a synchronizing word included in the reproduced frame-added electric signal is detected, and a frame-added electric signal whose frame has been synchronized is output (post-stage synchronizing word detecting step S18).

It is determined whether or not the number of successive synchronizing words whose bit errors are equal to or smaller than the allowable value, among the synchronizing words included in the frame-added electric signal whose frame has been synchronized, has reached a prescribed number in a predetermined number of frames subsequent to the frame whose synchronizing word has been detected in pre-stage synchronizing word detecting step S15 (post-stage frame synchronization detecting step S19).

If the number of successive synchronizing words has not reached the prescribed number, then control goes back to step S15.

If the number of successive synchronizing words has reached the prescribed number, then it is decided that the positions of the synchronizing words are correct, and the synchronizing words are removed from the frame-added electric signal whose frame synchronization has been established, thereby reproducing the data signal (frame terminating step S20).

In FIG. 13, post-stage frame synchronization detecting step S19 counts the number of successive synchronizing words whose bit errors are equal to or smaller than the allowable value from the synchronizing words detected in post-stage synchronizing word detecting step S18. However, since the position of a synchronizing word has already been detected in pre-stage synchronizing word detecting step S15, post-stage frame synchronization detecting step S19 may compare the synchronizing word in a frame-added electric signal whose errors have been corrected and a predetermined reference synchronizing word based on the detected position, and count the number of successive synchronizing words whose bit errors are equal to or smaller than the allowable value. In such a modification, post-stage synchronizing word detecting step S18 is dispensed with.

Since post-stage frame synchronization detecting step S19 counts the number of successive synchronizing words whose bit errors are equal to or smaller than the allowable value based on the frame-added electrical signal whose errors have been corrected in FEC decoding step S17, it is possible to activate a frame synchronization established state with ease even in the event that bit errors are caused in the transmission link. Consequently, it is possible to output a data signal quickly and also to resume the detection of synchronizing words quickly.

Exemplary Embodiment 9

Figure 14:
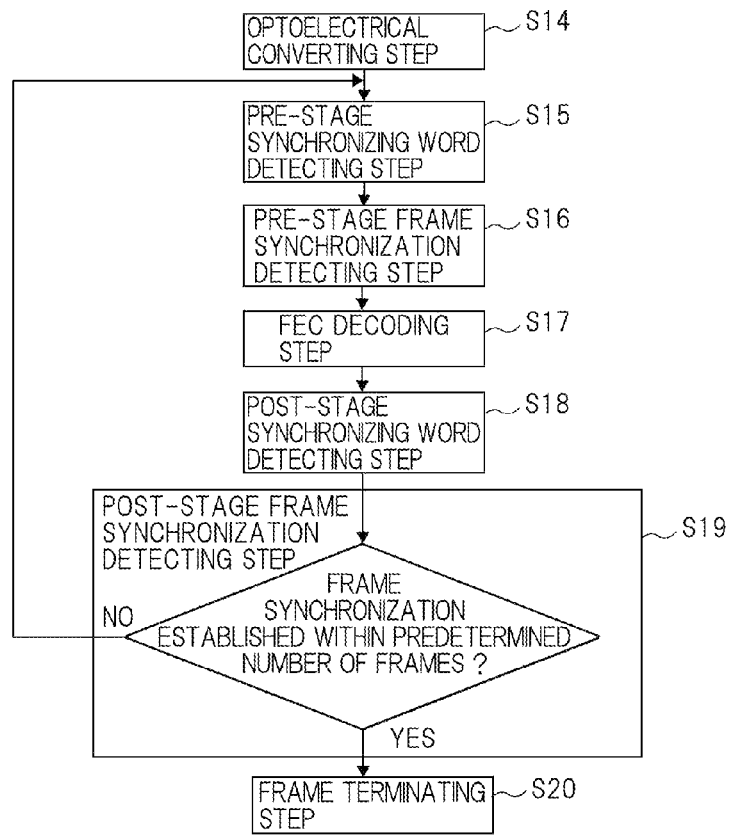
FIG. 14 is a flowchart of an optical receiving program to be executed by a computer according to an exemplary embodiment of the present invention.

FIG. 14 is a flowchart of an optical receiving sequence (steps S14 through S20) to be executed by a computer under the control of an optical receiving program according to the present exemplary embodiment of the present invention.

According to the optical receiving sequence, an optical signal is received and optoelectrically converted to reproduce an error-correcting-code-added electric signal (optoelectrical converting step S14). Then, a synchronizing word included in the error-correcting-code-added electric signal is detected, and an error-correcting-code-added electric signal whose frame has been synchronized is output (pre-stage synchronizing word detecting step S15).

If the number of successive synchronizing words whose bit errors are equal to or smaller than the allowable value, among the synchronizing words detected in pre-stage synchronizing word detecting step S15, has reached the prescribed number, then provisional frame synchronization is established (pre-stage frame synchronization detecting step S16).

An error correcting process is performed on the error-correcting-code-added electric signal whose frame has been synchronized, reproducing the frame-added electric signal (FEC decoding step S17). Then, a synchronizing word included in the reproduced frame-added electric signal is detected, and a frame-added electric signal whose frame has been synchronized is output (post-stage synchronizing word detecting step S18).

It is determined whether or not the number of successive synchronizing words whose bit errors are equal to or smaller than the allowable value, among the synchronizing words included in the frame-added electric signal whose frame has been synchronized, has reached a prescribed number in a predetermined number of frames subsequent to the frame whose synchronizing word has been detected in pre-stage synchronizing word detecting step S15 (post-stage frame synchronization detecting step S19).

If the number of successive synchronizing words has not reached the prescribed number, then control goes back to step S15.

If the number of successive synchronizing words has reached the prescribed number, then it is decided that the positions of the synchronizing words are correct, and the synchronizing words are removed from the frame-added electric signal whose frame synchronization has been established, thereby reproducing the data signal (frame terminating step S20).

The difference from exemplary embodiment 8 lies in the fact that, as shown in FIG. 14, pre-stage frame synchronization detecting step S16 is added after pre-stage synchronizing word detecting step S15.

More specifically, in pre-stage frame synchronization detecting step S16, when the counted number of successive synchronizing words whose bit errors are equal to or smaller than the allowable value, among the synchronizing words detected in pre-stage synchronizing word detecting step S15, has reached the prescribed number, provisional frame synchronization is judged as being established, and the provisional frame synchronization display signal is made high and the process of detecting a synchronizing word is interrupted. When the provisional frame synchronization display signal is made high, FEC decoding step S17 is started.

According to the present exemplary embodiment, as described above, inasmuch as a synchronizing word is detected if the bit errors of the synchronizing words detected in pre-stage synchronizing word detecting step S15 are equal to or smaller than the allowable value, the optical transceiving method can be applied to transmission links with more bit errors. When the number of successive synchronizing words whose bit errors are equal to or smaller than the allowable value has reached the prescribed number, it is decided that provisional frame synchronization has been established. Therefore, the accuracy with which to establish provisional frame synchronization is increased. After provisional frame synchronization has been established, post-stage frame synchronization detecting step S19 determines whether or not frame synchronization has been established.

In FIG. 14, post-stage frame synchronization detecting step S19 counts the number of successive synchronizing words whose bit errors are equal to or smaller than the allowable value from the synchronizing words detected in post-stage synchronizing word detecting step S18. However, since the position of a synchronizing word has already been detected in pre-stage synchronizing word detecting step S15, post-stage frame synchronization detecting step S19 may compare the synchronizing word in a frame-added electric signal whose errors have been corrected with a predetermined reference synchronizing word based on the detected position, and count the number of successive synchronizing words whose bit errors are equal to or smaller than the allowable value. In such a modification, post-stage synchronizing word detecting step S18 is dispensed with.

Since post-stage frame synchronization detecting step S19 counts the number of successive synchronizing words whose bit errors are equal to or smaller than the allowable value based on the frame-added electrical signal whose errors have been corrected in FEC decoding step S17, it is possible to activate a frame synchronization established state with ease even in the event that bit errors are caused in the transmission link. Consequently, it is possible to output a data signal quickly and also to resume the detection of synchronizing words quickly.

The allowable value for bit errors which is used in pre-stage frame synchronization detecting step S16 should preferably be greater than the allowable value for bit errors which is used in post-stage frame synchronization detecting step S19. With these allowable values, a provisional frame synchronization established state can quickly be activated. The allowable value for bit errors which is used in pre-stage frame synchronization detecting step S16 is set to 2, and the allowable value for bit errors which is used in post-stage frame synchronization detecting step S19 is set to 0, for example. However, these numerical values are given by way of example only, and can be changed.

The prescribed number to be compared with the number of successive synchronizing words in post-stage frame synchronization detecting step S19 should preferably be greater than the prescribed number to be compared with the number of successive synchronizing words in pre-stage frame synchronization detecting step S16. With these prescribed numbers, since a synchronizing word is detected from an electric signal whose errors have been corrected, erroneous synchronization is prevented from occurring. The prescribed number to be compared with the number of successive synchronizing words in post-stage frame synchronization detecting step S19 is set to 2, and the prescribed number to be compared with the number of successive synchronizing words in pre-stage frame synchronization detecting step S16 is set to 1, for example. However, these numerical values are provided by way of example only, and can be changed.

The principles of the present invention are applicable to optical communication systems. While preferred embodiments of the present invention have been described using specific terms, such description is for illustrative purposes only, and it is to be understood that changes and variations may be made without departing from the spirit or scope of the following claims.

(Addendum 1)

An optical receiving apparatus comprising:

an optoelectrical converting circuit which receives an optical signal and optoelectrically converts the optical signal to reproduce an error-correcting-code-added electric signal;

a pre-stage synchronizing word detecting circuit which detects a synchronizing word included in said error-correcting-code-added electric signal;

a decoder which performs an error correcting process on the error-correcting-code-added electric signal from which the synchronizing word has been detected, to reproduce a frame-added electric signal;

a post-stage frame synchronization detecting circuit which determines whether or not the first number of successive synchronizing words whose bit errors are equal to or smaller than a first allowable value, among synchronizing words included in said frame-added electric signal, has reached a first prescribed number, in a predetermined number of frames subsequent to a frame in which said synchronizing word has been detected; and a receiver frame synchronization display output circuit which decides that frame synchronization of said optical signal has been established if said first number of successive synchronizing words has reached said first prescribed number.

(Addendum 2)

The optical receiving apparatus according to Addendum 1, further comprising: a pre-stage frame synchronization detecting circuit which determines whether or not the second number of successive synchronizing words whose bit errors are equal to or smaller than a second allowable value, among synchronizing words detected by said pre-stage synchronizing word detecting circuit, has reached a second prescribed number;

wherein said decoder starts said error correcting process on said error-correcting-code-added electric signal if said second number of successive synchronizing words has reached said second prescribed number.

(Addendum 3)

The optical receiving apparatus according to Addendum 2, wherein said second allowable value is greater than said first allowable value.

(Addendum 4)

The optical receiving apparatus according to Addendum 2, wherein said first prescribed number is greater than said second prescribed number.

(Addendum 5)

An optical transceiving system including an optical transmitting apparatus and an optical receiving apparatus;

wherein said optical transmitting apparatus comprises:

a frame generating circuit which adds a synchronizing word to a data signal to generate a frame-added electric signal;

an encoder which adds an error correcting code to said frame-added electric signal to generate an error-correcting-code-added electric signal; and an electrooptical converting circuit which converts said error-correcting-code-added electric signal into an optical signal and transmits the optical signal; and wherein said optical receiving apparatus comprises:

an optoelectrical converting circuit which receives an optical signal and optoelectrically converts the optical signal to reproduce an error-correcting-code-added electric signal;

a pre-stage synchronizing word detecting circuit which detects a synchronizing word included in said error-correcting-code-added electric signal;

an FEC decoder which performs an error correcting process on the error-correcting-code-added electric signal from which the synchronizing word has been detected, to reproduce a frame-added electric signal;

a post-stage frame synchronization detecting circuit which determines whether or not the first number of successive synchronizing words whose bit errors are equal to or smaller than a first allowable value, among synchronizing words included in said frame-added electric signal, has reached a first prescribed number, in a predetermined number of frames subsequent to a frame in which said synchronizing word has been detected; and a receiver frame synchronization display output circuit which decides that frame synchronization of said optical signal has been established if said first number of successive synchronizing words has reached said first prescribed number.

(Addendum 6)

The optical transceiving system according to Addendum 5, wherein said optical receiving apparatus further comprises:

a pre-stage frame synchronization detecting circuit which determines whether or not the second number of successive synchronizing words whose bit errors are equal to or smaller than a second allowable value, among synchronizing words detected by said pre-stage synchronizing word detecting circuit, has reached a second prescribed number, wherein said FEC decoder starts said error correcting process on said error-correcting-code-added electric signal if said second number of successive synchronizing words has reached said second prescribed number.

(Addendum 7)

The optical transceiving system according to Addendum 6, wherein said second allowable value is greater than said first allowable value.

(Addendum 8)

The optical transceiving system according to Addendum 6, wherein said first prescribed number is greater than said second prescribed number.

(Addendum 9)

An optical receiving method comprising:

receiving an optical signal and optoelectrically converting the optical signal to reproduce an error-correcting-code-added electric signal;

detecting a synchronizing word included in said error-correcting-code-added electric signal;

performing an error correcting process on the error-correcting-code-added electric signal from which the synchronizing word has been detected, to reproduce a frame-added electric signal;

determining whether or not the first number of successive synchronizing words whose bit errors are equal to or smaller than a first allowable value, among synchronizing words included in said frame-added electric signal, has reached a first prescribed number, in a predetermined number of frames subsequent to a frame in which said synchronizing word has been detected; and deciding that frame synchronization of said optical signal has been established if said first number of successive synchronizing words has reached said first prescribed number.

(Addendum 10)

The optical receiving method according to Addendum 9, further comprising:

determining whether or not the second number of successive synchronizing words whose bit errors are equal to or smaller than a second allowable value, among synchronizing words detected by said pre-stage synchronizing word detecting circuit, has reached a second prescribed number;

wherein said error correcting process is started on said error-correcting-code-added electric signal if said second number of successive synchronizing words has reached said second prescribed number.

(Addendum 11)

The optical receiving method according to Addendum 10, wherein said second allowable value is greater than said first allowable value.

(Addendum 12)

The optical receiving method according to Addendum 10, wherein said first prescribed number is greater than said second prescribed number.

(Addendum 13)

An optical transceiving method to be performed by an optical transceiving system including an optical transmitting apparatus and an optical receiving apparatus;

wherein said optical transmitting apparatus adds a synchronizing word to a data signal to generate a frame-added electric signal;

said optical transmitting apparatus adds an error correcting code to said frame-added electric signal to generate an error-correcting-code-added electric signal; and said optical transmitting apparatus converts said error-correcting-code-added electric signal into an optical signal and transmits the optical signal; and wherein said optical receiving apparatus receives an optical signal and optoelectrically converts the optical signal to reproduce an error-correcting-code-added electric signal;

said optical receiving apparatus detects a synchronizing word included in said error-correcting-code-added electric signal;

said optical receiving apparatus performs an error correcting process on the error-correcting-code-added electric signal from which the synchronizing word has been detected, to reproduce a frame-added electric signal;

said optical receiving apparatus determines whether or not the first number of successive synchronizing words whose bit errors are equal to or smaller than a first allowable value, among synchronizing words included in said frame-added electric signal, has reached a first prescribed number, in a predetermined number of frames subsequent to a frame in which said synchronizing word has been detected; and said optical receiving apparatus decides that frame synchronization of said optical signal has been established if said first number of successive synchronizing words has reached said first prescribed number.

(Addendum 14)

The optical transceiving method according to Addendum 13, wherein said optical receiving apparatus determines whether or not the second number of successive synchronizing words whose bit errors are equal to or smaller than a second allowable value, among synchronizing words detected by said pre-stage synchronizing word detecting circuit, has reached a second prescribed number; and said optical receiving apparatus starts said error correcting process on said error-correcting-code-added electric signal if said second number of successive synchronizing words has reached said second prescribed number.

(Addendum 15)

The optical transceiving method according to Addendum 14, wherein said second allowable value is greater than said first allowable value.

(Addendum 16)

The optical transceiving method according to Addendum 14, wherein said first prescribed number is greater than said second prescribed number.

(Addendum 17)

A program which controls a computer to perform:

a process of receiving an optical signal and optoelectrically converting the optical signal to reproduce an error-correcting-code-added electric signal;

a process of detecting a synchronizing word included in said error-correcting-code-added electric signal;

a process of performing an error correcting process on the error-correcting-code-added electric signal from which the synchronizing word has been detected, to reproduce a frame-added electric signal;

a process of determining whether or not the first number of successive synchronizing words whose bit errors are equal to or smaller than a first allowable value, among synchronizing words included in said frame-added electric signal, has reached a first prescribed number, in a predetermined number of frames subsequent to a frame in which said synchronizing word has been detected; and a process of deciding that frame synchronization of said optical signal has been established if said first number of successive synchronizing words has reached said first prescribed number.

(Addendum 18)

The program according to Addendum 17, which further controls said computer to perform:

a process of determining whether the second number of successive synchronizing words whose bit errors are equal to or smaller than a second allowable value, among synchronizing words detected by said pre-stage synchronizing word detecting circuit, has reached a second prescribed number or not;

wherein the process to reproduce said frame-added electric signal starts said error correcting process on said error-correcting-code-added electric signal if said second number of successive synchronizing words has reached said second prescribed number.

(Addendum 19)

The program according to Addendum 18, wherein said second allowable value is greater than said first allowable value.

(Addendum 20)

The program according to Addendum 18, wherein said first prescribed number is greater than said second prescribed number.

What is claimed is:

1. An optical receiving apparatus comprising:
an optoelectrical converting circuit which receives an optical signal and optoelectrically converts the optical signal to reproduce an error-correcting-code-added electric signal;
a pre-stage synchronizing word detecting circuit which detects a synchronizing word included in said error-correcting-code-added electric signal;
a decoder which performs an error correcting process on the error-correcting-code-added electric signal from which the synchronizing word has been detected, to reproduce a frame-added electric signal;
a post-stage frame synchronization detecting circuit which determines whether or not the first number of successive synchronizing words whose bit errors are equal to or smaller than a first allowable value, among synchronizing words included in said frame-added electric signal, has reached a first prescribed number, in a predetermined number of frames subsequent to a frame in which said synchronizing word has been detected; and
a receiver frame synchronization display output circuit which decides that frame synchronization of said optical signal has been established if said first number of successive synchronizing words has reached said first prescribed number.

2. The optical receiving apparatus according to claim 1, further comprising:
a pre-stage frame synchronization detecting circuit which determines whether or not the second number of successive synchronizing words whose bit errors are equal to or smaller than a second allowable value, among synchronizing words detected by said pre-stage synchronizing word detecting circuit, has reached a second prescribed number;
wherein said decoder starts said error correcting process on said error-correcting-code-added electric signal if said second number of successive synchronizing words has reached said second prescribed number.

3. The optical receiving apparatus according to claim 2, wherein said second allowable value is greater than said first allowable value.

4. The optical receiving apparatus according to claim 2, wherein said first prescribed number is greater than said second prescribed number.

5. An optical transceiving system including an optical transmitting apparatus and an optical receiving apparatus;
wherein said optical transmitting apparatus comprises:
a frame generating circuit which adds a synchronizing word to a data signal to generate a frame-added electric signal;
an encoder which adds an error correcting code to said frame-added electric signal to generate an error-correcting-code-added electric signal; and
an electrooptical converting circuit which converts said error-correcting-code-added electric signal into an optical signal and transmits the optical signal; and
wherein said optical receiving apparatus comprises:
an optoelectrical converting circuit which receives an optical signal and optoelectrically converts the optical signal to reproduce an error-correcting-code-added electric signal;
a pre-stage synchronizing word detecting circuit which detects a synchronizing word included in said error-correcting-code-added electric signal;
an FEC decoder which performs an error correcting process on the error-correcting-code-added electric signal from which the synchronizing word has been detected, to reproduce a frame-added electric signal;
a post-stage frame synchronization detecting circuit which determines whether or not the first number of successive synchronizing words whose bit errors are equal to or smaller than a first allowable value, among synchronizing words included in said frame-added electric signal, has reached a first prescribed number, in a predetermined number of frames subsequent to a frame in which said synchronizing word has been detected; and
a receiver frame synchronization display output circuit which decides that frame synchronization of said optical signal has been established if said first number of successive synchronizing words has reached said first prescribed number.

6. The optical transceiving system according to claim 5, wherein said optical receiving apparatus further comprises:
a pre-stage frame synchronization detecting circuit which determines whether or not the second number of successive synchronizing words whose bit errors are equal to or smaller than a second allowable value, among synchronizing words detected by said pre-stage synchronizing word detecting circuit, has reached a second prescribed number;
wherein said FEC decoder starts said error correcting process on said error-correcting-code-added electric signal if said second number of successive synchronizing words has reached said second prescribed number.

7. The optical transceiving system according to claim 6, wherein said second allowable value is greater than said first allowable value.

8. The optical transceiving system according to claim 6, wherein said first prescribed number is greater than said second prescribed number.

9. An optical receiving method comprising:
receiving an optical signal and optoelectrically converting the optical signal to reproduce an error-correcting-code-added electric signal;
detecting a synchronizing word included in said error-correcting-code-added electric signal;
performing an error correcting process on the error-correcting-code-added electric signal from which the synchronizing word has been detected, to reproduce a frame-added electric signal;
determining whether or not the first number of successive synchronizing words whose bit errors are equal to or smaller than a first allowable value, among synchronizing words included in said frame-added electric signal, has reached a first prescribed number, in a predetermined number of frames subsequent to a frame in which said synchronizing word has been detected; and
deciding that frame synchronization of said optical signal has been established if said first number of successive synchronizing words has reached said first prescribed number.

10. The optical receiving method according to claim 9, further comprising:
determining whether or not the second number of successive synchronizing words whose bit errors are equal to or smaller than a second allowable value, among synchronizing words detected by said pre-stage synchronizing word detecting circuit, has reached a second prescribed number;
wherein said error correcting process is started on said error-correcting-code-added electric signal if said second number of successive synchronizing words has reached said second prescribed number.

11. The optical receiving method according to claim 10, wherein said second allowable value is greater than said first allowable value.

12. The optical receiving method according to claim 10, wherein said first prescribed number is greater than said second prescribed number.

* * * * *